United States Patent [19]

Hamon

[11] Patent Number: 5,383,358
[45] Date of Patent: Jan. 24, 1995

[54] CAPILLARY ACTION DEVICE FOR REMOVING CONDENSATION FORMED ON THE INSIDE SURFACE OF THE WINDOW OF A FLOWMETER

[75] Inventor: Serge Hamon, Macon, France

[73] Assignee: Schlumberger Industries, S.A., Montrouge, France

[21] Appl. No.: 65,000

[22] Filed: May 24, 1993

[30] Foreign Application Priority Data

Jun. 10, 1992 [FR] France .................. 92 07170

[51] Int. Cl.6 ........................................ G01F 15/14
[52] U.S. Cl. ................................. 73/273; 73/431; 15/250.41; 15/250.32
[58] Field of Search .............. 73/198, 273, 431; 15/250.1, 250.23, 250.32, 250.36, 250.41

[56] References Cited

U.S. PATENT DOCUMENTS

| 737,439 | 8/1903 | Michie | 73/431 |
| 2,274,396 | 2/1942 | Barry | 73/431 |
| 2,697,242 | 12/1954 | Elowson et al. | 73/273 |
| 2,738,672 | 3/1956 | Smith | 73/431 |
| 3,906,583 | 9/1975 | Murphy | 15/250.41 |

FOREIGN PATENT DOCUMENTS 3439958 5/1986 Germany .

*Primary Examiner*—Richard E. Chilcot, Jr.
*Assistant Examiner*—William L. Oen
*Attorney, Agent, or Firm*—Sanford J. Asman

[57] ABSTRACT

A device which removes condensation formed on the inside surface of the window of a flowmeter. The device comprises a circular skid guided for translational movement by a slideway and provided with a gutter laid against the inside surface of the window so as to remove the condensation by capillary action. The skid is moved by rotating a link driven by a manual control knob. Used for reading water meters of the dry or extra dry type.

7 Claims, 2 Drawing Sheets

CAPILLARY ACTION DEVICE FOR REMOVING CONDENSATION FORMED ON THE INSIDE SURFACE OF THE WINDOW OF A FLOWMETER

The present invention provides a device which removes the condensation formed on the inside surface of the window of a flowmeter, in particular a water meter.

BACKGROUND OF THE INVENTION

There are many known types of flowmeters for metering water: wet flowmeters in which both the mechanism and the indicator rolls are completely immersed in the liquid, and dry or extra dry flowmeters in which the indicator rolls are situated in a leak-proof chamber. The present invention relates only to water meters of the dry or extra dry type.

The indicator rolls of such flowmeters are read through a transparent window. If the dry chamber is not perfectly leak-proof, condensation can form on the inside surface of the window which makes reading the indications on the rolls difficult or impossible.

A device is known which is used to remove the condensation from the inside surface of the window of a dry or extra dry flowmeter. Such a device is shown in FIGS. 1 and 2.

FIG. 1 shows a schematic view from above of a prior art flowmeter, and FIG. 2 shows a section through the flowmeter on line AA. The device for wiping the window comprises a control knob 10 which is operable from outside the flowmeter and which passes sealingly through the window of the flowmeter. A spindle 14 extending from the knob 10 supports a blade 16 which is perpendicular to the spindle.

The upper surface of the blade 16 includes a longitudinal slot 18. A felt or rubber part 20 is secured in the slot 18 so as to rub against the inside surface 22 of the flowmeter window.

If reading of the rolls 24 which indicate the measurement of the flowmeter is prevented by condensation formed on the inside surface 22 of the window, the user operates control knob 10. As the blade is set in rotation, the rubbing action of the felt part 20 removes the condensation from the inside surface 22 of the window above the rolls 24.

This type of window wiper has disadvantages. As far as manufacture of the device is concerned, the felt part 20 has to be incorporated in the space 18 provided for it. This is a delicate operation which complicates the manufacturing process.

Moreover, the blade and the felt or rubber part are not transparent; consequently, that assembly masks the rolls of the flowmeter and hinders reading.

OBJECTS AND SUMMARY OF THE INVENTION

The present invention overcomes these disadvantages. It provides a device for removing the condensation from the inside surface of a flowmeter window, the mechanism of the device being easily mounted. In addition, any reading difficulties are eliminated since the device has a rest position outside the field of view for reading the rolls and also since it is possible to use transparent components.

More precisely, the device according to the invention comprises a movable skid provided with a gutter which bears against the inside surface of the window and which removes the condensation by capillary action.

Advantageously, the skid is circular and the gutter is provided around the circumference of the skid.

In a particular implementation, the inside surface of the window includes a guide slideway which receives the skid and which has stops at its ends which prevent the skid coming out of the slideway.

Advantageously, the guide slideway is L-shaped, the foot of the L forming a space which allows disengagement of the skid.

Preferably, the device comprises:
 a link which urges the skid against the inside surface of the window, the skid being moveably mounted on the link and
 a control knob which is sealingly mounted on the window and which can be rotated, one end of the link being integral with said knob.

Advantageously, the link and the skid are transparent.

BRIEF DESCRIPTION OF THE DRAWINGS

The features and advantages of the invention will be more apparent from the description which follows, given by way of non-limiting example and with reference to the accompanying drawings in which.

MORE DETAILED DESCRIPTION

Figure 1:
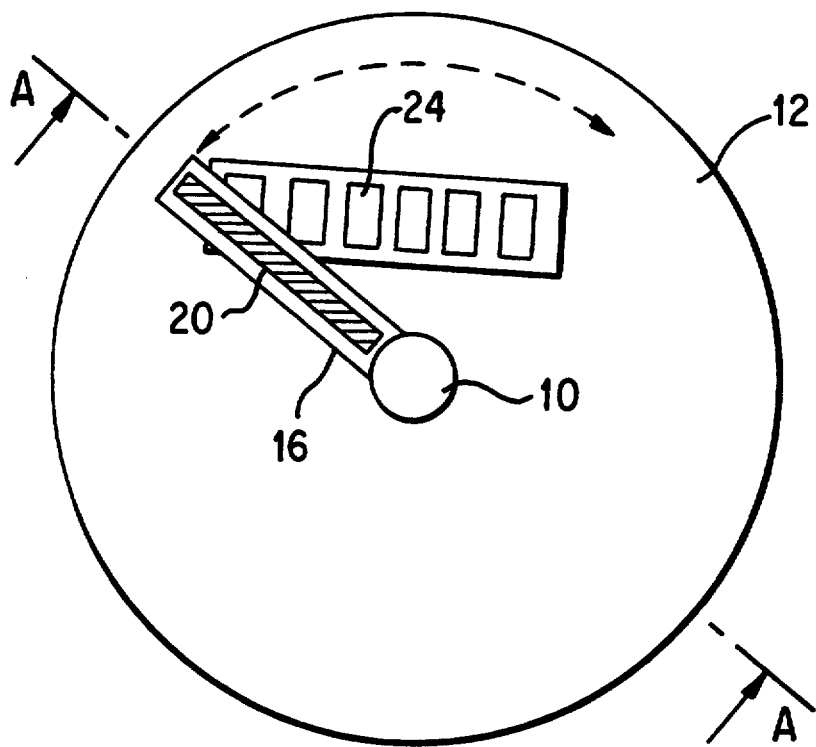
FIG. 1, already described, is a schematic view from above of a flowmeter provided with a prior art system for removing condensation.
Figure 2:
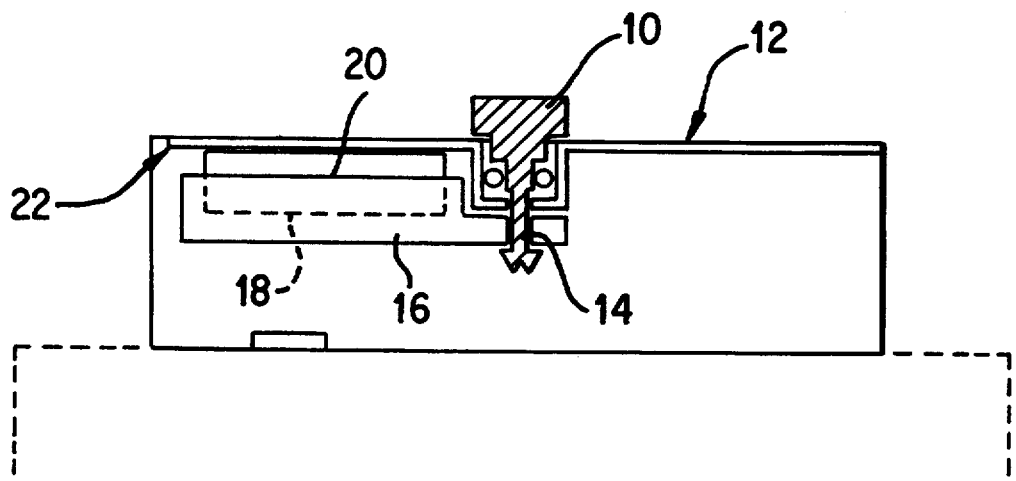
FIG. 2, already described, is a schematic a section through the device of the preceding Figure.
Figure 3:
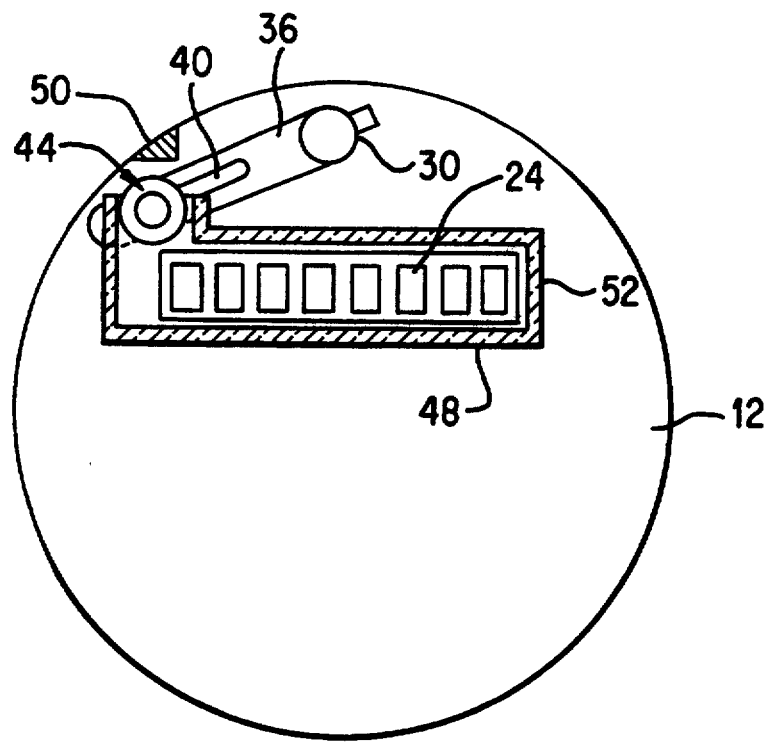
FIG. 3 is a schematic view from above of a device according to the invention.
Figure 4:
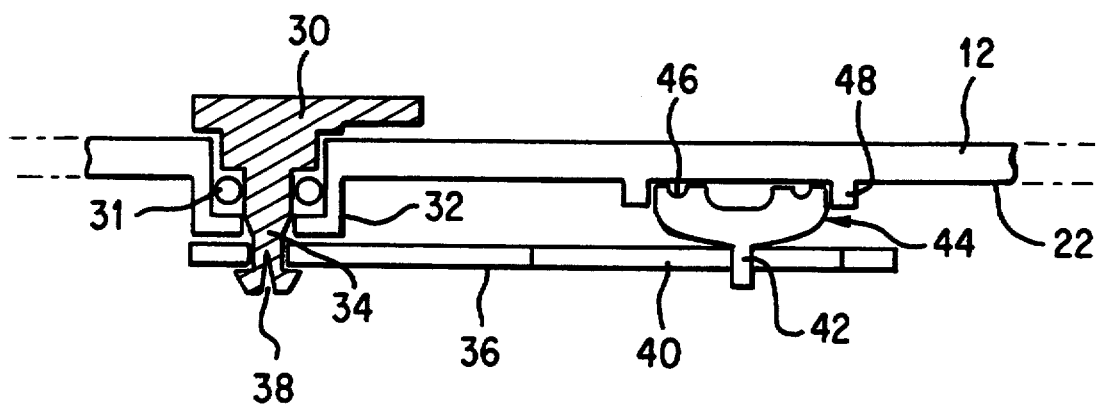
FIG. 4 is a schematic sectional view of this device.

A device according to the invention will now be described with reference to FIGS. 3 and 4.

The device comprises a control knob 30 sealingly mounted in a recess 32 formed in the window 12 of the flowmeter. Sealing is ensured by an O-ring 31 located inside the recess 32 and surrounding the body of control knob 30. Knob 30 is rotatable from outside the flowmeter. The knob has a spindle 34 which enters the interior of the flowmeter through the base of the recess 32.

The spindle 34 passes through a link 36 via of a hole formed for that purpose. Link 36 is secured to the spindle 34 by a snap-fastening mechanism 38 at the end of spindle 34.

Link 36 extends in a direction perpendicular to the spindle 34 and therefore parallel to the plane of the window 12. The link 36 has a longitudinal slot 40 which accommodates a spindle 42 secured to one face of a circular skid. The skid can therefore slide smoothly along slot 40 when the link 36 is operated.

Link 36 is positioned at a distance from the inside surface 22 of the window 12 such that the upper surface of the skid 44 is in contact with said inside surface 22 of the window. The amount of contact is such as to avoid significant friction between the upper surface of the skid 44 and the inside surface 22 of the window 12 when the skid 44 is moving.

The upper surface of the skid 44 includes a circumferential gutter 46 which, by capillary action, removes all condensation which may be deposited on the inside surface 22 of the window 12.

The inside surface 22 of the window 12 has guide edges 48 which form a slideway. The edges of the slideway are separate so as to receive and guide the skid 44, the slideway advantageously being L-shaped. The body of the L faces the indicator rolls 24 of the flowmeter. The foot of the L forms a disengagement space for the skid 44, so that it may be positioned outside the field of view for reading the rolls 24. The inside surface 22 of the window 12 is also provided with stops 50, 52 positioned so as to prevent the skid 44 from leaving the slideway 48 and therefore to limit the amplitude of its motion.

If, when a user wishes to read the indications on the rolls, the inside surface 22 of the window 12 is covered with condensation, he rotates the control knob 30. The link 36 therefore starts to rotate, imparting translational movement to the skid 44 guided by slideway 48. As it moves in translation, the condensation is drawn up by the gutter 46. One go-and-return movement allows the skid 44 to be positioned in its disengagement space so that reading is not hindered. Moreover, link 36 and skid 44 are formed of a transparent material, such as polycarbonate, polystyrene, or polymethyl-methacrylate (PMMA).

The indicator rolls can therefore be read whatever the position of the skid 44 in the slideway.

I claim:

1. A device for removing condensation from the inside surface of a flowmeter window, comprising a movable skid provided with a gutter which bears against the inside surface of the window and which removes the condensation by capillary action.

2. A device according to claim 1, wherein the skid is circular and the gutter is provided around the circumference of the skid.

3. A device according to claim 1, wherein the inside surface of the window comprises a guide slideway which receives the skid and which has stops at its ends which prevent the skid coming out of the slideway.

4. A device according to claim 3, wherein said guide slideway has a space for disengagement of the skid.

5. A device according to claim 4, wherein said guide groove is L-shaped, the foot of the L forming said disengagement space.

6. A device according to claim 1, comprising a link which urges the skid against the inside surface of the window, the skid being moveably mounted on the link, and a control knob which is sealingly mounted on the window and which can be rotated, one end of the link being secured to said knob.

7. A device according to claim 6, wherein the link and the skid are transparent.

* * * * *

UNITED STATES PATENT AND TRADEMARK OFFICE
CERTIFICATE OF CORRECTION

PATENT NO. : 5,383,358

DATED : January 17, 1995

INVENTOR(S) : George C. Yeh

It is certified that error appears in the above-identified patent and that said Letters Patent is hereby corrected as shown below:

Column 5, lines 46, 49, 51, 57, 60, 65 and 68, the term "pl", each occurrence, should read --$\rho_l$--.

Column 6, line 15, the word "of" should be deleted.

Signed and Sealed this

Eleventh Day of April, 1995

*Attest:*

BRUCE LEHMAN

*Attesting Officer*     *Commissioner of Patents and Trademarks*